(No Model.)
I. B. KLEINERT.
METHOD OF JOINING RUBBER FABRICS.
No. 298,095. Patented May 6, 1884.
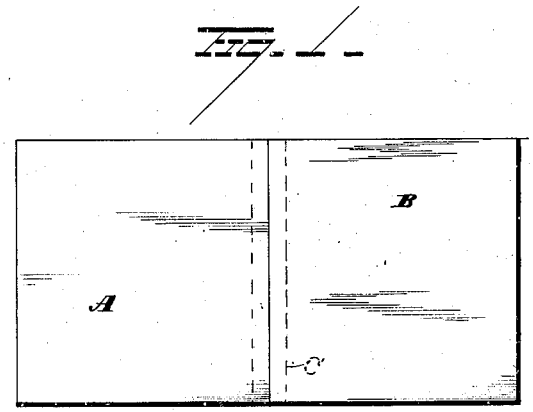
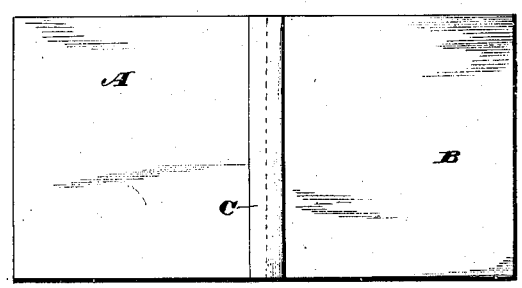
WITNESSES
C. Nottingham
George P. Downing
INVENTOR
I. B. Kleinert
By H. A. Seymour.
Attorney

UNITED STATES PATENT OFFICE.

ISAAC B. KLEINERT, OF NEW YORK, N. Y.

METHOD OF JOINING RUBBER FABRICS.

SPECIFICATION forming part of Letters Patent No. 298,095, dated May 6, 1884.

Application filed February 21, 1884. (No model.)

*To all whom it may concern:*

Be it known that I, ISAAC B. KLEINERT, of New York, in the county of New York and State of New York, have invented certain new and useful Improvements in Methods of Joining Rubber Fabrics; and I do hereby declare the following to be a full, clear, and exact description of the invention, such as will enable others skilled in the art to which it appertains to make and use the same.

My invention relates to an improvement in the method of uniting pieces of fibrous rubbered fabrics. The method commonly in use for uniting fabrics of this character consists in laying or lapping one edge over another, with cement or other adhesive preparation between the parts, and then either stitching the parts for additional strength or not, as the case may require. This method is objectionable, first, because it allows the moisture to creep along the surface of one piece, and thereby come in contact with the opposite surface of the other piece, and this the moisture will do in spite of the impervious quality of the material itself or adhesive preparation used for uniting the pieces; and, secondly, because of the roughness of the seam or lap on both sides of the fabric. In the case of dress-shields in particular the transmission of the moisture to that part which is to be protected is of a damaging nature.

The object of my present invention is to provide a method of joining two pieces of rubbered fabric in such a manner as to prevent the objectionable transmission of moisture from one surface of the fabric to the opposite surface, and at the same time render the seam smooth.

My process may be more fully understood by reference to the accompanying drawings, in which—

Figure 1 represents the face, and Fig. 2 the back, of a strip of stockinet formed by uniting two pieces.

A and B represent the two pieces of fabric, and C an additional thin strip for increasing the strength of the seam.

My method consists in, first, applying a preparation of rubber to each of the edges to be joined, and, secondly, placing the edges in contact while the rubber is soft, and thus uniting them by the cohesion of the rubber. A third or additional step, when greater strength is required, consists in cementing a thin strip of suitable material over the seam on the back surface of the fabric. By this method, the moisture, as it follows the thread of the fabric, is not brought thereby in contact with the opposite surface, and is furthermore prevented to a great extent from passing the seam by rubbered edges, where they are joined. The seam thus formed, it will be noticed, is perfectly smooth upon both surfaces when the re-enforcing strip is not used, and when the said strip is used is perfectly smooth upon one surface and nearly so upon the other.

Having fully described my invention, what I claim as new, and desire to secure by Letters Patent, is—

1. The method of uniting pieces of rubbered fabric by applying a preparation of rubber to the edges to be joined, and then bringing the edges in contact without overlapping them, to allow the rubber to cohere, substantially as set forth.

2. A seam formed by the cohesion of rubber, said rubber having been applied to two edges of rubbered fabric, and a strengthening-strip cemented over the joined edges, substantially as set forth.

In testimony whereof I have signed this specification in the presence of two subscribing witnesses.

ISAAC B. KLEINERT.

Witnesses:
JOSEPH S. MICHAEL,
JOSEPH B. LYMAN.